US012032659B2

United States Patent
Jin et al.

(10) Patent No.: US 12,032,659 B2
(45) Date of Patent: Jul. 9, 2024

(54) METHOD FOR IDENTIFYING DRY SALT FLAT BASED ON SENTINEL-1 DATA

(71) Applicant: Qinghai Normal University, Xining (CN)

(72) Inventors: Xin Jin, Xining (CN); Yanxiang Jin, Xining (CN); Dengxing Yang, Xining (CN); Di Fu, Xining (CN)

(73) Assignee: QINGHAI NORMAL UNIVERSITY (CN)

( * ) Notice: Subject to any disclaimer, the term of this patent is extended or adjusted under 35 U.S.C. 154(b) by 422 days.

(21) Appl. No.: 17/574,837

(22) Filed: Jan. 13, 2022

(65) Prior Publication Data

US 2022/0222497 A1 Jul. 14, 2022

(30) Foreign Application Priority Data

Jan. 13, 2021 (CN) .......................... 202110043391.5

(51) Int. Cl.
*G06F 18/25* (2023.01)
*G06F 18/2411* (2023.01)
*G06V 20/13* (2022.01)

(52) U.S. Cl.
CPC ........ *G06F 18/256* (2023.01); *G06F 18/2411* (2023.01); *G06V 20/13* (2022.01)

(58) Field of Classification Search
CPC .. G06F 18/256; G06F 18/2411; G01J 3/0224; G01J 3/10; G01J 3/4412; G01N 21/293; G01N 2201/4709; G06V 20/13; G06V 20/10–194; G06T 2207/30181; G06T 2207/20081; G06N 7/023; G06N 20/00
See application file for complete search history.

(56) References Cited

PUBLICATIONS

Q. Zhang, L. Li, R. Sun, D. Zhu, C. Zhang and Q. Chen, "Retrieval of the Soil Salinity From Sentinel-1 Dual-Polarized SAR Data Based on Deep Neural Network Regression," in IEEE Geoscience and Remote Sensing Letters, vol. 19, pp. 1-5, 2020, Art No. 4006905, doi: 10.1109/LGRS.2020.3041059 (Year: 2020).*

Gao, Q., Zribi, M., Escorihuela, M. J., & Baghdadi, N. Synergetic Use of Sentinel-1 and Sentinel-2 Data for Soil Moisture Mapping at 100 m Resolution. 2017. Sensors (Basel, Switzerland), 17(9), 1966. https://doi.org/10.3390/s17091966 (Year: 2017).*

Chen, Y., Qiu, Y., Zhang, Z., Zhang, J., Chen, C., Han, J., & Liu, D. (2020). Estimating salt content of vegetated soil at different depths with Sentinel-2 data. PeerJ, 8, e10585. https://doi.org/10.7717/peerj.10585 (Year: 2020).*

Q. Zhang, Z.-S. Zhou, P. Caccetta, J. Simons and L. Li, (2020). "Sentinel-1 Imagery Incorporating Machine Learning for Dryland Salinity Monitoring: A Case Study in Esperance, Western Australia," IGARSS 2020—2020 IEEE International Geoscience and Remote Sensing Symposium, Waikoloa, HI, USA (Year: 2020).*

(Continued)

*Primary Examiner* — Vu Le
*Assistant Examiner* — Jack Peter Kraynak
(74) *Attorney, Agent, or Firm* — Onello & Mello, LLP

(57) ABSTRACT

A method for identifying a dry salt flat based on the sentinel-1 data is provided. The method includes: carrying out field survey and acquiring data; processing sentinel-1 data; determining backscattering values, spectrum characteristics and colors of different polarization; and determining a classification criterion and carrying out threshold classification.

6 Claims, 5 Drawing Sheets

(56) References Cited

PUBLICATIONS

Qi, G., Zhao, G., & Xi, X. (2020). Soil Salinity Inversion of Winter Wheat Areas Based on Satellite-Unmanned Aerial Vehicle-Ground Collaborative System in Coastal of the Yellow River Delta. Sensors (Basel, Switzerland), 20(22), 6521. https://doi.org/10.3390/s20226521 (Year: 2020).*

* cited by examiner

PDI threshold ranges
- 0.046934001-0.150510035
- 0.150510035-0.209296433
- 0.209296433-0.265283478
- 0.265283478-0.371658865
- 0.371658865-0.757969479

METHOD FOR IDENTIFYING DRY SALT FLAT BASED ON SENTINEL-1 DATA

CROSS REFERENCE TO RELATED APPLICATION

This patent application claims the benefit and priority of Chinese Patent Application No. 202110043391.5 filed on Jan. 13, 2021, the disclosure of which is incorporated by reference herein in its entirety as part of the present application.

TECHNICAL FIELD

The present disclosure relates to the field of remote sensing measurement, and in particular to a method for identifying a dry salt flat based on sentinel-1 data.

BACKGROUND ART

Sentinel-1 satellite is an earth observation satellite in Global Monitoring for Environment and Security (GMES) of European space Agency, including two satellites and C-band synthetic aperture radar, which can provide continuous images (such as in daytime, night and various weather conditions). Dry salt flats have great resource exploitation potentiality owing to its rich magnesium and lithium resources. However, there are few automatic methods for identifying the dry salt flats at present. Most of them entail a lot of time and manpower on field survey, which cannot meet research requirements.

SUMMARY

To solve the above technical problems, the technical solution provided by the present disclosure is as follows. A method for identifying a dry salt flat based on a sentinel-1 data includes the following steps:
  step 1: preprocessing the sentinel-1 data with sentinel application platform (SNAP) software to obtain a backscattering coefficient;
  step 2: calculating a perpendicular drought index (PDI) with optical image data to obtain an index distribution diagram;
  step 3: mapping a part of measured data to the backscattering coefficient and the PDI, extracting corresponding backscattering coefficients, colors, textures and spectrum characteristics of a salt lake and the dry salt flat in different polarization, and then determining thresholds of ranges of the backscattering coefficients and the PDI of different classification types, where the measured data is data for soil moisture and salinity of the dry salt flat and the salt lake acquired in field survey.
  step 4: selecting one threshold as an initial estimation value from a maximum threshold and a minimum threshold of the PDIs of the salt lake and the dry salt flat, continuously updating the estimation value until a given condition is satisfied, and finally establishing a classification criterion for the salt lake, the dry salt flat and a non-dry salt flat;
  step 5: performing band combination on the PDI, the optical images and the sentinel-1 data including vertical transmit/vertical receive (VV) and vertical transmit/horizontal receive (VH) polarization to obtain multi-source combined remote sensing data; and
  step 6: collecting training samples based on the established classification criterion for the salt lake, the dry salt flat and the non-dry salt flat and in a form of the multi-source combined remote sensing data, and classifying the training samples by utilizing Support Vector Machine (SVM) to finally obtain a classification result map of the salt lake, the dry salt flat and the non-dry salt flat.

Further, acquiring the measured data may include: searching for a typical dry salt flat area, selecting sampling points, measuring soil salinity and soil moisture for each sampling point, quantifying the dry salt flat, determining ranges of the soil salinity and the soil moisture of the dry salt flat, and fixing a point in an area with the salt lake.

Further, the data in the step 5 may be supervised and classified by means of multi-source remote sensing data including the PDI, the optical remote sensing data and microwave remote sensing data, instead of only one type of remote sensing data, and the multi-source remote sensing data is capable of reflecting more information, such as red, green, blue and other spectrum information; and with the aid of information on an imaging characteristic capable of penetration of some landmark, the multi-source information is more conducive to classification of the landmark.

Further, the method may further include a verification step, in which the verification step includes: mapping the rest of the measured data to the result map, and checking whether the measured data can correspond to the dry salt flat and the salt lake or not.

Further, the verification step may include: identifying the results as the dry salt flat, extracting the spectrum characteristic, the color, the texture, the backscattering coefficient and the PDI for an area not subjected to field survey, and verifying whether the area meets the classification criterion or not.

With the above solution, the advantages of the present disclosure are as follows.

(1) The advantages in terms of data: C-band synthetic aperture radar carried by the sentinel-1 has an all-weather imaging capability, can provide high-resolution and medium-resolution measurement data of land, coastal and ice without being affected by clouds, and can detect millimeter-level or sub-millimeter-level stratum movement; the dry salt flat has the characteristics of drought and high salinity and the sentinel-1 data is sensitive to soil layer salt and moisture, for example, in an image in the VV polarization, as the data is sensitive to water, so the wetter the place, the darker the image feature is; and in the VH polarization, as the data is more sensitive to salt than water, so when the salinity is higher, the feature is brighter and whiter in the image.

(2) It does not need to take a lot of time and manpower on field survey by utilizing the method of the present disclosure, especially in large research areas. Since dry salt flats in some areas have a color generally identical to that of common soil, it is difficult to distinguish the two from each other by naked eyes. Instead, such distinguishing can be better achieved by using the method of the present disclosure.

Corresponding to the method for identifying a dry salt flat based on a sentinel-1 data provided above, the present disclosure further provides a system for identifying a dry salt flat based on a sentinel-1 data, including a processor, a memory, a communication interface and a bus.

Specifically, a data exchange can be performed among the processor, the communication interface and the memory through the bus. And the processor is configured to call logical instructions memorized in the memory to execute the method for identifying a dry salt flat based on a sentinel-1 data provided above; the communication interface is configured to transmit information.

BRIEF DESCRIPTION OF THE DRAWINGS

In order to more clearly illustrate the technical solutions in the embodiments of the present disclosure, a brief introduction to the accompanying drawings required for the embodiments will be given below.

DETAILED DESCRIPTION OF THE EMBODIMENTS

In order to make the object, technical solutions and advantages of the embodiments of the present disclosure clearer, the technical solutions in the embodiments of the present disclosure will be described clearly and completely below in combination with the accompanying drawings in the embodiments of the present disclosure. Obviously, the described embodiments are some but not all of the embodiments of the present disclosure. Generally, components of the embodiments of the present disclosure described and shown in the accompanying drawings may be arranged and designed in various different configurations.

EMBODIMENTS

Figure 1:
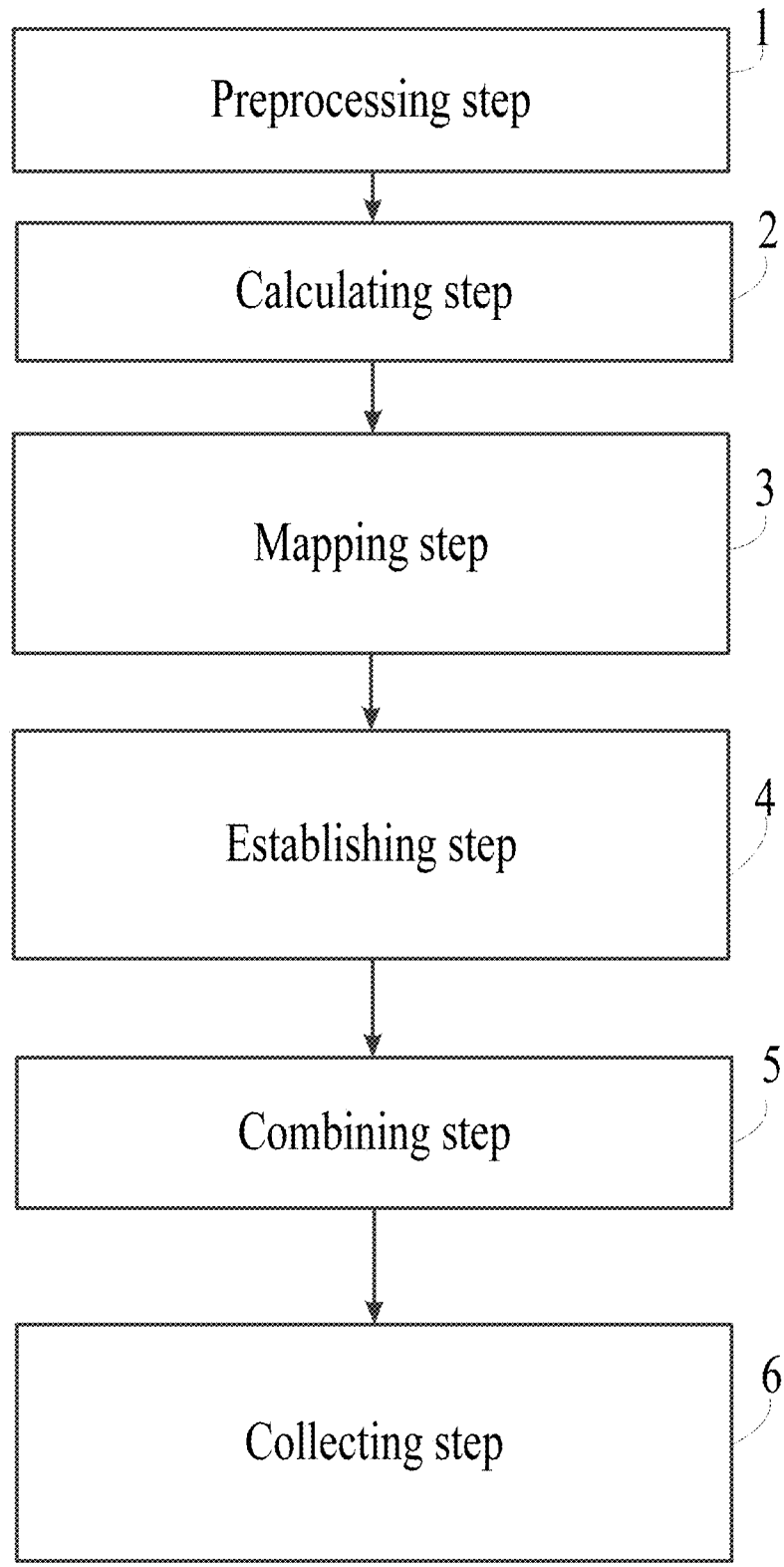
FIG. 1 is a flow chart of a method for identifying a dry salt flat based on the sentinel-1 data according to the present disclosure.
Figure 2:
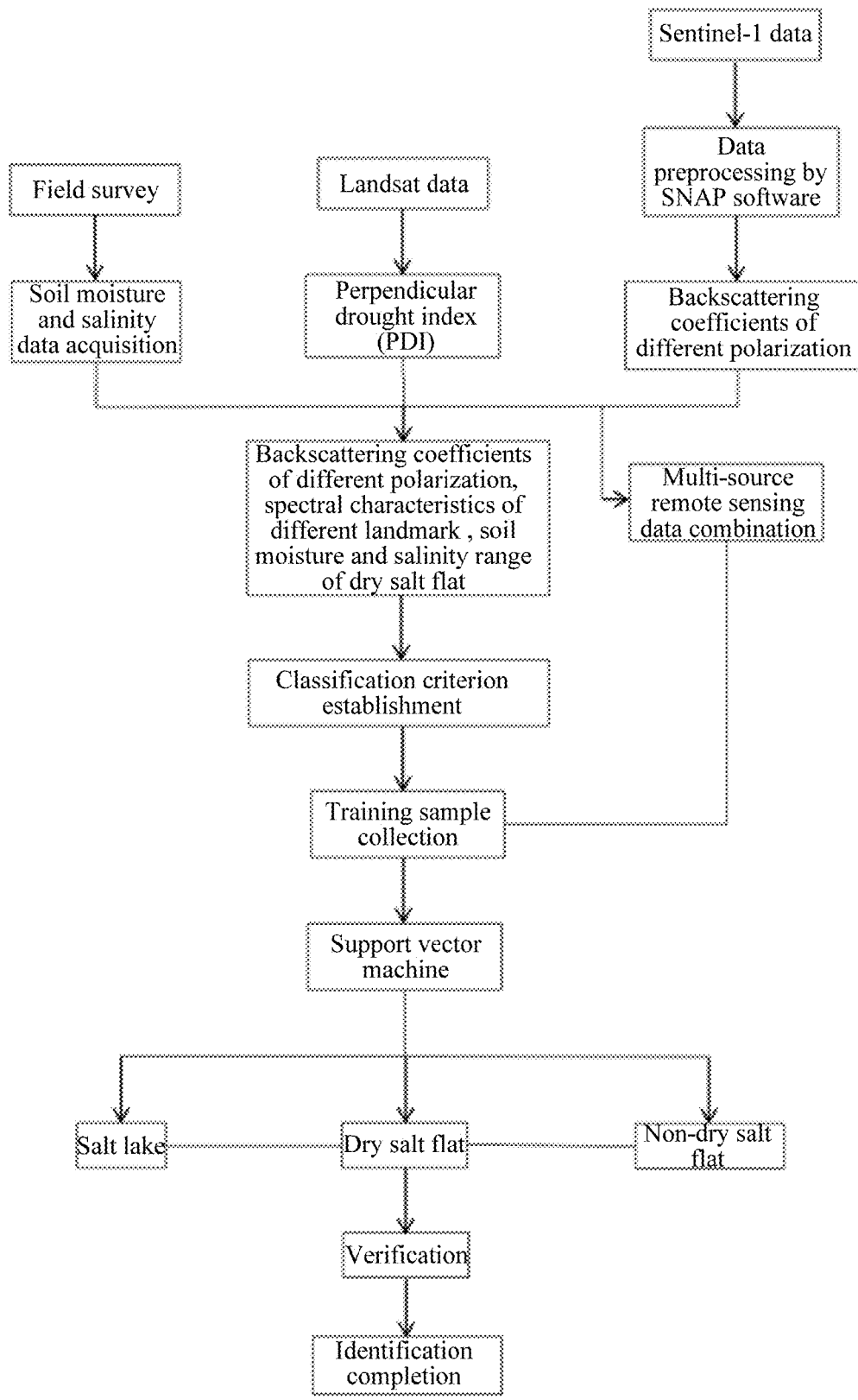
FIG. 2 is a block diagram of a method for identifying a dry salt flat based on a sentinel-1 data according to the present disclosure.
Figure 3:
FIG. 3 is a schematic diagram of a distribution of backscattering coefficients processed by SNAP software according to the present disclosure.

As shown in FIGS. 1 and 2, a method for identifying a dry salt flat based on a sentinel-1 data includes the following steps:

In step 1, the sentinel-1 data is preprocessed with sentinel application platform (SNAP) software to obtain a backscattering coefficient, as shown in FIG. 3. The SNAP is used to carry out preprocessing such as de-noising, speckle filtering, radiometric calibration, topographic correction, geocoding, clipping and resampling, to eliminate errors of the sentinel-1 data caused by geometric distortion, noise, atmospheric molecule, aerosol scattering, etc., and to enhance image information, so as to obtain real ground object reflectivity, namely the backscattering coefficient for vertical transmit/vertical receive (VV) polarization and vertical transmit/horizontal receive (VH) polarization.

Figure 4:
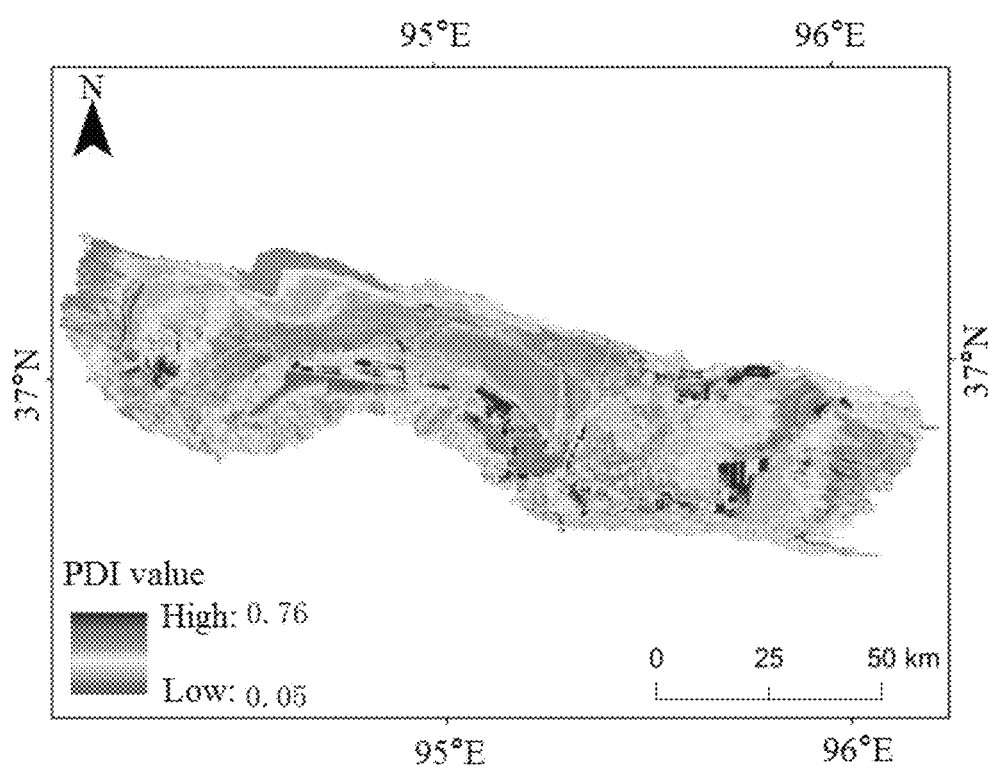
FIG. 4 is a schematic diagram of a distribution of PDIs according to the present disclosure.

In step 2, a perpendicular drought index (PDI) is calculated with current optical image data to obtain an PDI distribution diagram, as shown in FIG. 4.

Figure 5:
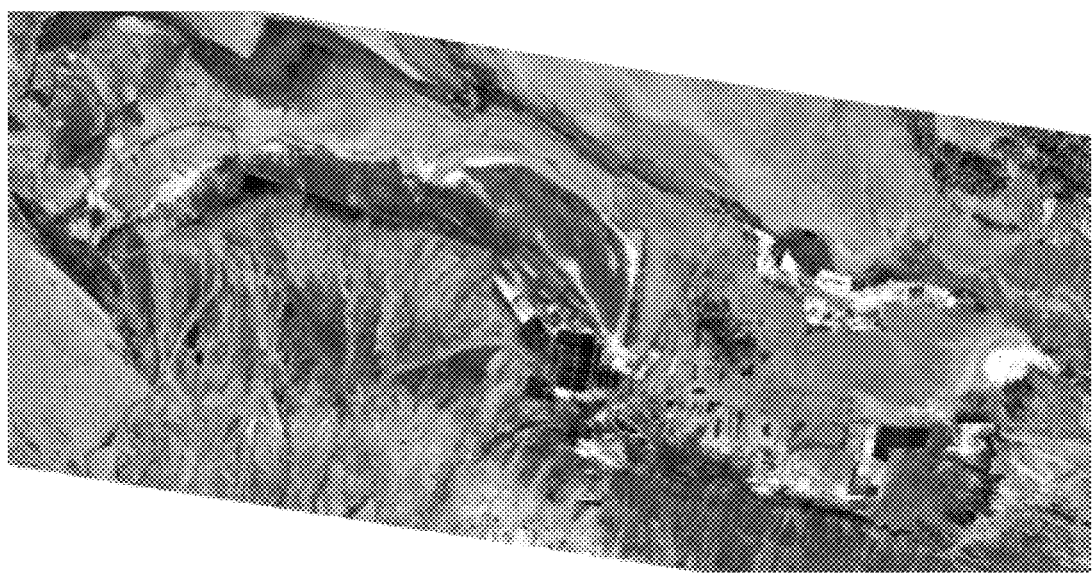
FIG. 5 is a schematic diagram of an example of optical image data according to the present disclosure.

The optical image data is usually image data obtained by visible light transducers and infrared transducers, as shown in FIG. 5. Different from the optical image data, the radar image data of sentinel-1 has a strong penetration capacity, and may be not affected by clouds. For example, the optical image data is Landsat data, obtained from USGS website (http://glovis.usgs.gov/), and shows visible spectrum and part of infrared spectrum information, texture information, color information and so on of ground objects. The ENVI software is used to carry out preprocessing such as radiometric calibration and atmospheric correction on Landsat data, and then further calculate the PDIs.

In step 3, measured data is mapped to the backscattering coefficients and the PDIs, corresponding backscattering coefficients, colors, textures and spectrum characteristics of a salt lake and the dry salt flat are extracted in different polarization, and thresholds of ranges of the backscattering coefficients and the PDIs of different classification types are determined.

The measured data is data for soil moisture and salinity of the dry salt flat and the salt lake acquired in field survey. In field survey, a soil salinity measurement instrument and a soil moisture measurement instrument can be used for acquiring the data for soil moisture and salinity respectively and sampling points are positioned through a global positioning system (GPS). Therefore, when the measured data is mapped to the backscattering coefficients and the PDIs, the data for soil moisture and salinity of the dry salt flat and the salt lake can be acquired. In addition, a maximum threshold and a minimum threshold of PDIs of the dry salt flat and the salt lake can be determined according to a valley bottom of a histogram.

In step 4, one threshold is selected as an initial estimation value from the maximum threshold and the minimum threshold of the PDIs of the dry salt flat and the salt lake, the estimation value is continuously updated until a given condition is satisfied, and a classification criterion for the salt lake, the dry salt flat and a non-dry salt flat is finally established.

Figure 6:
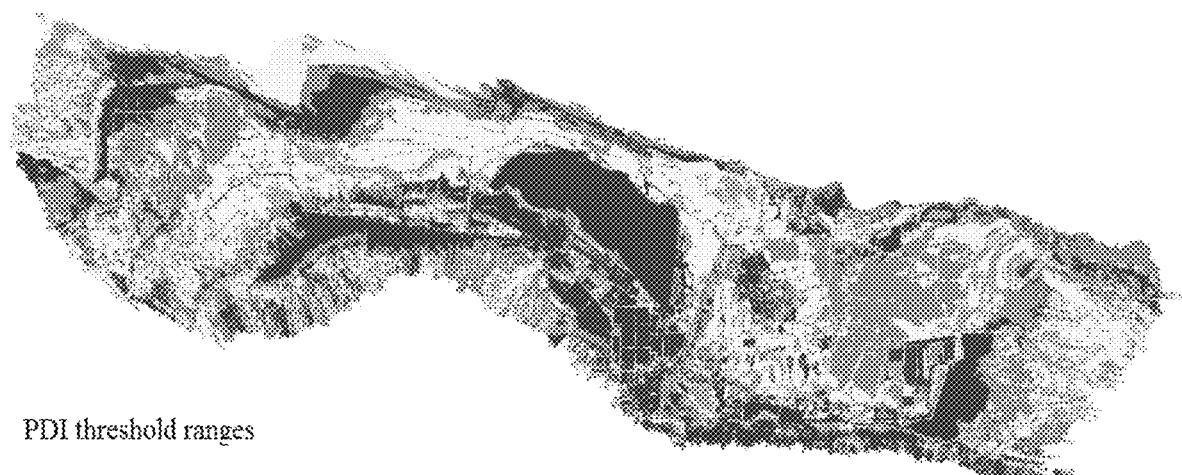
FIG. 6 is a schematic diagram of the five PDI threshold ranges according to the present disclosure.

Specifically, in an example, in the step 3, it can be determined that the PDIs of the salt lake is in a range of 0.046934001 to 0.150510035 and the PDIs of the dry salt flat is in a range of 0.209296433 to 0.265283478, and as shown in FIG. 6. The entire range of PDIs can be divided into five subranges by the above two subranges. Specifically, salt lakes are mainly distributed in the subrange of 0.046934001-0.150510035; dry salt flats are mainly distributed in the subrange of 0.209296433-0.265283478; marshlands are mainly distributed in the subrange of 0.150510035-0.209296433, in which some dry salt flats are distributed; salt ponds are mainly distributed in the subrange of 0.371658865-0.757969479; and dry salt flats and salt ponds are distributed in the subrange of 0.265283478-0.371658865. In the initial range of the salt lake 0.046934001-0.150510035, marshlands are also distributed therein, and an estimation value needs to be determined to adjust the range. Not all the dry salt flats are distributed in the initial range 0.209296433-0.265283478, and some dry salt flats are further distributed in the range of 0.265283478-0.371658865. Similarly, it is also need to determine an estimation value in this range to adjust the thresholds of the dry salt flat.

For example, by adjusting the range of 0.046934001-0.150510035 of the salt lake with 0.04 as an estimation value at a step size of 0.01, it is determined that the marshlands are mainly distributed in the range of 0.12-0.15, and the range of the salt lake is 0.04-0.12. By adjusting the range of 0.265283478-0.371658865 of the dry salt flat with 0.26 as an estimation value at a step size of 0.01, it is determined that the dry salt flats are mainly distributed in the range of 0.26-0.3. By adjusting the range of the marshland with 0.15 as an estimation value at a step size of 0.01, it is determined that the dry salt flats are mainly distributed in the range 0.18-0.21. According to the above experiments, it can be determined that the range of the salt lake is 0.04-0.12, and the range of the dry salt flat is 0.18-0.3.

In step 5, band combination is performed on the PDI, the optical images and the sentinel-1 data including VV and VH polarization to obtain multi-source combined remote sensing data. For example, the PDIs, the optical image data and the backscattering coefficients in VH/VV polarization modes are combined by a layer stacking tool in the ENVI, so as to enhance the image information and improve the accuracy of the supervised classification.

In step 6, training samples are collected based on the established classification criterion for the salt lake, the dry salt flat and the non-dry salt flat and in a form of the multi-source combined remote sensing data, and the training samples are classified by utilizing Support Vector Machine (SVM) to finally obtain a classification result map of the salt lake, the dry salt flat and the non-dry salt flat.

Specifically, by using the ENVI, the supervised classification, such as random forest and support vector machine, is performed on the training samples to extract the dry salt flat from other ground objects.

As a preferred implementation of the present embodiment, acquiring measured data may include: searching for a typical dry salt flat area, selecting sampling points, measuring soil salinity and soil moisture for each sampling point, quantifying the dry salt flat, determining ranges of the soil salinity and the soil moisture of the dry salt flat, and fixing a point in an area with the salt lake.

As a preferred implementation of the present embodiment, the data in the step 5 is supervised and classified by means of multi-source remote sensing data including the PDI, the optical remote sensing data and microwave remote sensing data, instead of only one type of remote sensing data, and the multi-source remote sensing data is capable of reflecting more information, such as red, green, blue and other spectrum information; and with the aid of information on an imaging characteristic capable of penetration of some landmark, the multi-source information is more conducive to classification of the landmark.

As a preferred implementation of the present embodiment, the method may further include a verification step, in which the verification step includes: mapping the rest of the measured data to the result map, and checking whether the measured data can correspond to the dry salt flat and the salt lake or not.

As a preferred implementation of the present embodiment, the verification step includes: identifying the results as the dry salt flat, extracting the spectrum characteristic, the color, the texture, the backscattering coefficient and the PDI for an area not subjected to field survey, and verifying whether the area meets the classification criterion or not.

Synthetic aperture radar data of sentinel-1 has a spatial resolution of 10 m. Compared with an optical image, the data can be transmitted through clouds without being affected by weather, and millimeter-level or sub-millimeter-level stratum movement can be detected, rather than only the part visible to naked eyes. For some areas, since the dry salt flats cannot be well distinguished from the soil by naked eyes, it is extremely time-consuming and laborious to measure the salinity and moisture of soil by using the traditional methods. In addition, it is very difficult to travel to reach some areas. With the use of the sentinel-1 data and the feature of the dry salt flat in different polarization, the dry salt flat can be better identified.

Figure 7:
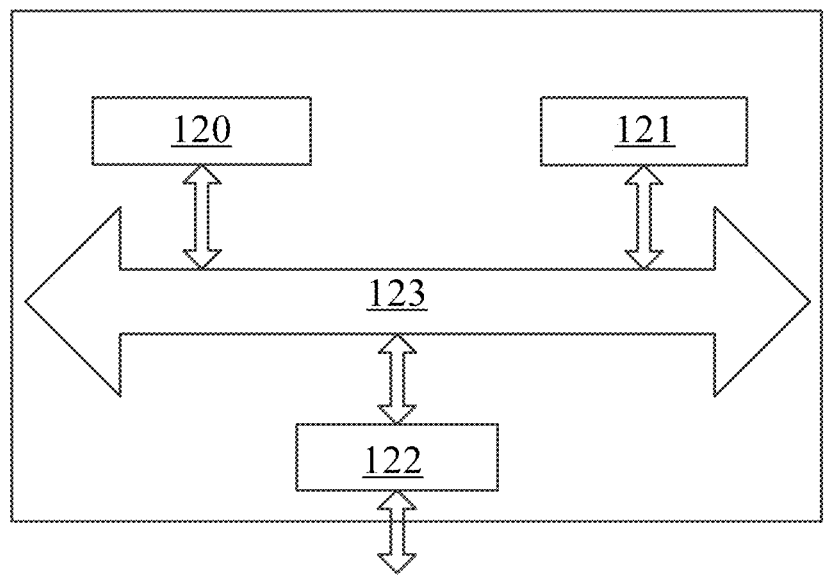
FIG. 7 is a schematic structural diagram of a system for identifying a dry salt flat based on a sentinel-1 data according to the present disclosure.

Corresponding to the method for identifying a dry salt flat based on a sentinel-1 data mentioned above, the present disclosure further provides a system for identifying a dry salt flat based on a sentinel-1 data, as shown in FIG. 7, including a processor 120, a memory 121, a communication interface 122 and a bus 123.

Specifically, a data exchange can be performed among the processor 120, the memory 121 and the communication interface 122 through the bus 123, the processor 120 may call the logical instructions stored in the memory 121 to execute the method for identifying a dry salt flat based on a sentinel-1 data mentioned above, and the communication interface 122 is configured to transmit information.

In addition, if the above-mentioned logical instructions stored in the memory 121 are implemented in the form of software functional units and functions as an independent product for sale or use, it can be stored in a computer-readable storage medium.

As a computer-readable storage medium, the memory 121 can be used to store software programs and computer-executable programs, such as program instructions/modules corresponding to the methods in the embodiments of the present disclosure. The processor 120 executes the function application and data processing i.e., the method for identifying a dry salt flat based on a sentinel-1 data mentioned above, by running the program instructions/modules stored in the memory 121.

The memory 121 may include a storage program area and a storage data area, wherein the storage program area may store an operating system and an application program required for at least one function; the storage data area may store data created according to the use of the terminal device. In addition, the memory 121 may include high-speed random access memory, and may also include non-volatile memory.

In this specification, various embodiments are described in a progressive manner, with each embodiment focusing on its differences from other embodiments, while cross reference would be enough for those same or similar parts between the embodiments. As the system disclosed in the embodiment corresponds to the method disclosed in the embodiment, its description is relatively simple, and the correlated parts can be found in the method description.

Principles and implementation of this present disclosure described by specific examples, and the explanation of the above embodiments is only used to help understand the method and its core idea of the present disclosure. Also, those of ordinary skills in the art may take some modifications in the specific implementation and application scope according to the idea of the present disclosure. To sum up, the content of this specification should not be construed as limiting the present disclosure.

What is claimed is:

1. A method for identifying a dry salt flat based on sentinel-1 data, comprising:
preprocessing step, for preprocessing the sentinel-1 data with sentinel application platform (SNAP) software to obtain backscattering coefficients;
calculating step, for calculating perpendicular drought indexes (PDIs) with optical image data to obtain an index distribution diagram;
mapping step, for mapping a part of measured data to the backscattering coefficients and the PDIs, extracting corresponding backscattering coefficients, colors, textures and spectrum characteristics of a salt lake and a dry salt flat in different polarizations, and then determining thresholds of ranges of the backscattering coefficients and the PDI of different classification types, wherein the measured data is soil moisture data and salinity data of the dry salt flat and the salt lake acquired in field survey;

establishing step, for selecting one threshold as an initial estimation value from a maximum threshold and a minimum threshold of the PDIs of the salt lake and the dry salt flat, continuously updating the estimation value until a given condition is satisfied, and establishing a classification criterion for the salt lake, the dry salt flat and a non-dry salt flat;

combining step, for performing band combination on the PDIs, the optical images and the sentinel-1 data including vertical transmit/vertical receive (VV) and vertical transmit/horizontal receive (VH) polarization to obtain multi-source combined remote sensing data; and collecting step, for collecting training samples based on the established classification criterion for the salt lake, the dry salt flat and the non-dry salt flat and in a form of the multi-source combined remote sensing data, and classifying the training samples by utilizing Support Vector Machine (SVM) to obtain a classification result map of the salt lake, the dry salt flat and the non-dry salt flat.

2. The method according to claim 1, wherein acquiring measured data comprises: searching for a typical dry salt flat area, selecting sampling points, measuring soil salinity and soil moisture for each sampling point, quantifying the dry salt flat, determining ranges of the soil salinity and the soil moisture of the dry salt flat, and fixing a point in an area with the salt lake.

3. The method according to claim 1, wherein the data in the combining step is supervised and classified by means of multi-source remote sensing data including the PDI, the optical remote sensing data and microwave remote sensing data, instead of only one type of remote sensing data, and the multi-source remote sensing data is capable of reflecting more information, such as red, green, blue and other spectrum information; and with the aid of information on an imaging characteristic capable of penetration of some landmark, the multi-source information is more conducive to classification of the landmark.

4. The method according to claim 1, further comprising a verification step, wherein the verification step comprises: mapping the rest of the measured data to the result map, and checking whether the measured data can correspond to the dry salt flat and the salt lake or not.

5. The method according to claim 4, wherein the verification step comprises: identifying the results as the dry salt flat, extracting the spectrum characteristic, the color, the texture, the backscattering coefficient and the PDI for an area not subjected to field survey, and verifying whether the area meets the classification criterion or not.

6. A system for identifying a dry salt flat based on sentinel-1 data, comprising a processor, a memory, a communication interface and a bus;

wherein a data exchange is performed among the processor, the communication interface and the memory through the bus; the processor is configured to call logical instructions stored in the memory to execute the method according to claim 1; and the communication interface is configured to transmit information.

\* \* \* \* \*